(12) United States Patent
Fleury et al.

(10) Patent No.: US 6,813,426 B2
(45) Date of Patent: Nov. 2, 2004

(54) FIBER WITH CONTINUOUSLY CHANGING CHROMATIC DISPERSION

(75) Inventors: Ludovic Fleury, Bois D'Arcy (FR); Louis-Anne de Montmorillon, Paris (FR); Pierre Sillard, Le Chesnay (FR); Pascale Nouchi, Maisons-Lafitte (FR)

(73) Assignee: Alcatel, Paris (FR)

( * ) Notice: Subject to any disclaimer, the term of this patent is extended or adjusted under 35 U.S.C. 154(b) by 66 days.

(21) Appl. No.: 10/208,779

(22) Filed: Aug. 1, 2002

(65) Prior Publication Data

US 2003/0044145 A1 Mar. 6, 2003

(30) Foreign Application Priority Data

Aug. 16, 2001 (FR) .............................................. 01 10849

(51) Int. Cl.[7] .............................. G02B 6/02; G02B 6/16; G02B 6/22
(52) U.S. Cl. ....................................... 385/123; 385/127
(58) Field of Search ................................. 385/123–128

(56) References Cited

U.S. PATENT DOCUMENTS

| 5,483,612 | A |  | 1/1996 | Gallagher et al. |  |
| 5,925,163 | A |  | 7/1999 | Evans et al. |  |
| 6,421,491 | B1 | * | 7/2002 | Liu | 385/127 |
| 6,535,675 | B1 | * | 3/2003 | Rousseau et al. | 385/123 |
| 6,594,428 | B1 | * | 7/2003 | Tanaka et al. | 385/123 |
| 2002/0141719 | A1 | * | 10/2002 | Liu | 385/127 |
| 2003/0128948 | A1 | * | 7/2003 | Tirloni et al. | 385/127 |

FOREIGN PATENT DOCUMENTS

| EP | 0 724 171 A2 | 7/1996 |
| EP | 0 789 256 A2 | 8/1997 |
| EP | 1 113 314 A1 | 7/2001 |

OTHER PUBLICATIONS

Patent Abstracts of Japan, vol. 1999, No. 11, Sep. 30, 1999 & JP 11 160744 A (Nippon Telegraph & AMP; Telegraph Corp & Lt; NTT>) Jun. 18, 1999.

Bogatyrev V A et al: "A single–mode Fiber with Chromatic Dispersion Varying along the Length" Journal of Lightwave Technology, IEEE. New York, US, vol. 9, No. 5, May 1991, pp. 561–566.

Nakajima K et al: "Four–Wave Mixing Suppression Effect of Dispersion Distributed Fibers" Journal of Lightwave Technology, IEEE. New York, US, vol. 17, No. 10, Oct. 1999, pp. 1814–1822.

Kozuhito Tajima: "Compensation of Solution Broadening in Nonlinear Optical Fibers With Loss", Optics Letters, Optical Society of America, Washington, US, vol. 12, No. 1, 1987, pp. 54–56.

* cited by examiner

*Primary Examiner*—John D. Lee
*Assistant Examiner*—Tina M Lin
(74) *Attorney, Agent, or Firm*—Sughrue Mion, PLLC (57) ABSTRACT

The invention provides a fiber with continuously changing chromatic dispersion; it limits the quantity of dispersion-compensating fiber needed in a transmission system to compensate the cumulative chromatic dispersion in the line fiber. The fiber has a higher chromatic dispersion at a first end than at the other end, referred to as the second end. The chromatic dispersion varies along the fiber, decreasing over at least a portion of the fiber. At the first end the chromatic dispersion can be of the order of the dispersion of a conventional line fiber, i.e. close to 8 ps/(nm.km). At the second end the chromatic dispersion can have a value of the order of 4 ps/(nm.km). The fiber is used as the line fiber in a transmission system at the beginning of a section between two repeaters. The chromatic dispersion in the vicinity of the first end limits non-linear effects at the beginning of the section; the decrease of the chromatic dispersion in the fiber ensures that at its second end the fiber can be connected to a fiber having lower chromatic dispersion. The fiber can be produced with an index profile in the shape of a rectangle and a ring by varying only the indices, and not the radii.

20 Claims, 4 Drawing Sheets

FIBER WITH CONTINUOUSLY CHANGING CHROMATIC DISPERSION

The present invention relates to optical fiber transmission systems, and more specifically to compensating chromatic dispersion and chromatic dispersion slope in optical fiber transmission systems.

BACKGROUND OF THE INVENTION

The index profile of optical fibers is generally characterized as a function of the shape of the graph of the function which associates the refractive index and the radius of the fiber. It is conventional to plot the distance r from the center of the fiber on the abscissa axis and the difference between the refractive index and the refractive index of the cladding of the fiber on the ordinate axis. The expressions "step", "trapezium" and "triangle" are used for the index profiles of graphs which are respectively step-shaped, trapezium-shaped and triangular. These curves are generally representative of the theoretical or set point profile of the fiber and fiber fabrication constraints can yield a significantly different profile.

It is advantageous to control chromatic dispersion in new wavelength division multiplex (WDM) transmission networks using high bit rates, especially bit rates of 10 gigabits per second (Gbit/s) and above; the objective is to obtain substantially zero cumulative chromatic dispersion over the whole of the link for all wavelengths of the multiplex, in order to limit broadening of the pulses. A cumulative dispersion value of a few hundred ps/nm over the whole of a transmission system is acceptable. It is also useful to avoid zero values of chromatic dispersion in the vicinity of wavelengths used in the system, since non-linear effects are more accentuated at such zero values. Finally, it is also useful to limit the chromatic dispersion slope over the range of the multiplex in order to prevent or limit distortion between channels of the multiplex. This problem of compensating chromatic dispersion and chromatic dispersion slope is particularly acute in transmission systems using very high bit rates, typically WDM transmission systems using a bit rate per channel of 40 Gbit/s and above. The problem becomes increasingly acute as bandwidth increases and reaches values as high as or greater than 30 nanometers (nm) or even 35 nm.

Single-mode fiber (SMF) is conventionally used as line fiber in optical fiber transmission systems. The applicant's ASMF 200 single-mode fiber has a chromatic dispersion cancellation wavelength $\lambda_0$ in the range 1300 nm to 1320 nm and chromatic dispersion that is less than or equal to 3.5 picoseconds per nanometer kilometer (ps/(nm.km)) in the range 1285 nm to 1330 nm and that is equal to 17 ps/(nm.km) at 1550 nm. The chromatic dispersion slope at 1550 nm is of the order of 0.06 ps/(nm$^2$.km).

Dispersion-shifted fibers (DSF) are now available off the shelf. They have substantially zero chromatic dispersion at the transmission wavelengths at which they are used, which as a general rule are not the wavelength of 1.3 micrometers ($\mu$m) at which the dispersion of silica is substantially zero; this means that the non-zero chromatic dispersion of the silica is compensated by an increase in the index difference $\Delta n$ between the core of the fiber and the optical cladding. This explains the use of the term "shifted": the index difference shifts the wavelength at which there is zero chromatic dispersion, and is obtained by introducing dopants into the preform during fabrication thereof, for example by a modified chemical vapor deposition (MCVD) process that is known to the person skilled in the art and is not described in more detail here.

At the wavelengths at which they are used, non-zero dispersion-shifted fibers (NZ–DSF+) have low non-zero positive chromatic dispersion, typically less than 10 ps/(nm.km) at 1550 nm, and chromatic dispersion slope in the range 0.04 ps/(nm$^2$.km) to 0.1 ps/(nm$^2$.km).

FR-A-2 790 107 proposes a line fiber which is particularly suitable for dense WDM transmission with a channel spacing of 100 GHz or less for a bit rate per channel of 10 Gbit/s; at a wavelength of 1550 nm, this fiber has an effective surface area greater than or equal to 60 $\mu$m$^2$, a chromatic dispersion in the range 6 ps/(nm.km) to 10 ps/(nm.km) and a chromatic dispersion slope less than 0.07 ps/(nm$^2$.km).

Using short lengths of dispersion-compensating fiber (DCF) to compensate chromatic dispersion and chromatic dispersion slope in single-mode line fiber or non-zero dispersion-shifted line fiber is known in the art. An example of a transmission system in which chromatic dispersion in a single-mode line fiber is compensated by using dispersion-compensating fiber is described by M. Nishimura et al. in "Dispersion-compensating fibers and their applications", OFC'96 Technical Digest ThA1. The use of a dispersion-compensating fiber is also mentioned by L. Grüner-Nielsen et al. in "Large volume manufacturing of dispersion-compensating fibers", OFC'98 Technical Digest TuD5. A drawback of this type of fiber is its high cost.

Dispersion-compensating fibers are described in a number of patents. At wavelengths in the vicinity of 1550 nm they have a negative chromatic dispersion, which can be used to compensate the cumulative chromatic dispersion in the line fiber, and can also have a negative chromatic dispersion slope, which can be used to compensate the positive chromatic dispersion slope of the line fiber. U.S. Pat. Nos. 5,568,583 and 5,361,319 propose a dispersion-compensating fiber suitable for compensating chromatic dispersion in single-mode fiber and having a chromatic dispersion of the order of 17 ps/(nm.km) at a wavelength of 1550 nm. WO-A-99/13366, EP-A-0 674 193 and U.S. Pat. No. 5,838,867 provide other examples of dispersion-compensating fibers for use with dispersion-shifted fibers. The drawbacks of dispersion-shifted fibers are their cost and the attenuation that they introduce into the system.

Dispersion-managed fibers (DMF) having dispersions that vary with length have been proposed. These fibers are an alternative to using dispersion-compensating fibers. One proposed solution forms a fiber with adjacent sections having opposite chromatic dispersions and chromatic dispersion slopes, with transition regions between sections that are as short as possible. For example, fibers of this kind are proposed in EP-A-0 737 873, EP-A-0 949 520, EP-A-0 949 519, WO-A-99/57822, WO-A-99/42869 and U.S. Pat. No. 5,887,105. They limit non-linear effects, the chromatic dispersion remaining high except in the short transition regions; the total chromatic dispersion of the fiber is controlled by choosing the lengths and chromatic dispersions of the sections.

In "Designing a large effective area fiber for submarine systems" (NFOEC'99, National Fiber Optics Engineer Conference), T. J. Atwood and W. K. Adcox highlight the importance of the effective surface area in reducing non-linear effects; they indicate that the effective length of non-linear interactions is of the order of 20 kilometers (km) for single-mode fiber. They also propose an ideal dispersion profile for a transmission system.

Making the chromatic dispersion of fiber for transmitting RZ soliton signals decrease exponentially as a function of the length of the fiber has also been proposed; the resulting fibers are called dispersion-decreasing fibers (DDF). The chromatic dispersion varies along the fiber to preserve soliton conditions for propagation along the fiber, despite the attenuation of the signals. Thus EP-A-0 789 256 proposes a fiber in which the index profile is progressively varied between the two ends of the fiber. To enable soliton transmission, the fiber has positive chromatic dispersion at one end and zero or very low chromatic dispersion at the other end. The fiber is obtained by fabricating a preform with a varying profile, which yields a fiber with a constant diameter after drawing. The fiber is used as line fiber in soliton signal transmission systems. EP-A-0 789 256 also proposes a decreasing-dispersion fiber for soliton transmission. That document proposes the use of discrete chromatic dispersion changes along the fiber, to approximate an exponential decrease in the chromatic dispersion of the fiber, rather than varying the characteristics of the fiber continuously. WO-A-98/25861 proposes a method of fabricating this kind of fiber.

With the objective of reducing backscattering by the Brillouin effect, even if the intensity of the light injected into the fiber increases, EP-A-0 518 749 proposes a stepped index fiber having varying propagation characteristics. It proposes to vary the diameter and the refractive index of the core, the composition of the glass and the residual tension in the core along the length of the fiber accordingly. The variations proposed in the examples are periodic variations.

The decreasing-dispersion fibers proposed in the prior art, and in the last-mentioned document in particular, are suitable for soliton signals. Against the background of the prior art discussed above, the problem addressed by the invention is that of compensating chromatic dispersion in transmission systems, and in particular in terrestrial transmission systems for non-soliton signals. The invention proposes a solution for limiting the total chromatic dispersion in the transmission system and thus the length of dispersion compensating fiber needed. Another problem that arises in the prior art, and which is solved by some embodiments of the invention, is that of fabricating fibers whose propagation characteristics vary with length; the solution proposed in WO-A-98/25861 entails compensating a conical configuration preform, which complicates the fabrication process.

OBJECTS AND SUMMARY OF THE INVENTION

To this end, the invention proposes a fiber whose chromatic dispersion varies as a function of length. The fiber has higher chromatic dispersion at its first end than at its second end. Moreover, the chromatic dispersion of the fiber decreases in a regular or localized manner over at least a portion of the length of the fiber.

The fiber is used in particular in a transmission system as the line fiber at the start of a section between two repeaters; the value of the chromatic dispersion in the vicinity of the first end of the fiber limits non-linear effects when the signals transmitted in the fiber still have high power. The decrease in chromatic dispersion enables a transition to a line fiber of lower chromatic dispersion, which can moreover form part of the fiber. The combination has cumulative chromatic dispersion lower than the prior art line fiber, which limits the need for chromatic dispersion compensation.

To be more precise, the invention proposes an optical fiber having at its first end chromatic dispersion in the range +6 ps/(nm.km) to +17 ps/(nm.km) and at its second end a chromatic dispersion in the range +3 ps/(nm.km) to +14 ps/(nm.km); the difference between the chromatic dispersion at the first end of the fiber and the chromatic dispersion at the second end of the fiber is greater than or equal to 2.5 ps/(nm.km) and chromatic dispersion varies continuously along the fiber.

The fiber preferably has a first portion in the vicinity of its first end in which the average chromatic dispersion is greater than or equal to 6 ps/(nm.km). The first part can have a length greater than or equal to 10 km; the rate of longitudinal variation of the chromatic dispersion in the first portion is preferably in the range −1.4 ps/(nm.km$^2$) to +0.1 ps/(nm.km$^2$).

In one embodiment of the invention the rate of variation of chromatic dispersion along the fiber is substantially constant. This rate can have a value in the range −1.4 ps/(nm.km$^2$) to −0.05 ps/(nm.km$^2$).

The variation of chromatic dispersion can be effected substantially completely within a length of the fiber less than the total length of the fiber. In a first example, the length of the portion of the fiber in which the chromatic dispersion decreases is in the range 10 km to 35 km. In this case, the rate of longitudinal variation of the chromatic dispersion in the portion of the fiber in which the chromatic dispersion decreases is preferably in the range −1.4 ps/(nm.km$^2$) to −0.07 ps/(nm.km$^2$).

The length of the portion of the fiber in which the chromatic dispersion decreases can also be in the range 1 km to 5 km. In this case, the rate of longitudinal variation of the chromatic dispersion in the portion of the fiber in which the chromatic dispersion decreases is advantageously in the range −14 ps/(nm.km$^2$) to −0.5 ps/(nm.km$^2$).

In all case, the fiber can have a second portion in the vicinity of its second end in which the chromatic dispersion is less than or equal to 14 ps/(nm.km). The second portion can have a length greater than or equal to 1 km.

The fiber advantageously has at any point an index profile in the shape of a rectangle with a depleted trench and a ring. In this case, the radii of the rectangle, the depleted trench and the ring are preferably identical along the fiber.

The invention also proposes a transmission system including at least one repeater and a fiber of the above kind receiving at its first end signals amplified in the repeater. A fiber with substantially constant chromatic dispersion can be connected to the second end of said fiber.

BRIEF DESCRIPTION OF THE DRAWINGS

Other features and advantages of the invention will become apparent on reading the following description of embodiments of the invention, which is given by way of example and with reference to the accompanying drawings, in which.

MORE DETAILED DESCRIPTION

The invention proposes a fiber having at its first end chromatic dispersion in the range +6 ps/(nm.km) to +17 ps/(nm.km) and at its second end chromatic dispersion in the range +3 ps/(nm.km) to +14 ps/(nm.km). Between these two ends, the chromatic dispersion decreases by at least 2.5 ps/(nm.km). In use, the first end of the fiber, at which the chromatic dispersion is the highest, is the entry end of the fiber. From this point of view the fiber is directional.

The following description covers various embodiments of the invention. In a first embodiment, which is described with reference to FIGS. 2 to 5, the rate of variation of the chromatic dispersion along the fiber is substantially constant from one end of the fiber to the other. In a second embodiment, which is described with reference to FIGS. 6 to 8, the chromatic dispersion varies more markedly in a portion of the fiber; in other words, the variation of the chromatic dispersion is not evenly distributed along the fiber, but is more localized. In these two embodiments the fiber does not include any splices: it can be obtained by drawing a preform whose chemical vapor deposition (CVD) or vapor axial deposition (VAP) characteristics (thickness of deposited layers and/or concentration of dopants) vary along its axis. The MCVD process yields variations of the chromatic dispersion over drawn fiber lengths of 10 km or more. The MCVD process is therefore particularly suitable for producing fibers having a constant and relatively low rate of longitudinal variation of chromatic dispersion. The VAD process yields variations of the chromatic dispersion over drawn fiber lengths of 1 km or more. The VAD process is therefore particularly suitable for producing fibers having a limited area in which the chromatic dispersion varies at a greater rate.

The fiber can also be obtained by drawing a preform whose core has been modified by grinding and surfaced with silica by a non-constant flux plasma deposition process, as described in EP 0 737 873 A2; this yields sudden variations in the optical characteristics of the drawn fiber, typically over drawn fiber lengths of the order of 1 to 5 km, with rates of longitudinal variation of chromatic dispersion that remain within the ranges mentioned below.

The losses caused by jointing fibers are avoided by using a preform with a modified core, such as a core in which the deposition characteristics are varied along the preform. The absence of splices along the fiber is visible to the person skilled in the art, either by visual inspection of the fiber or by analysis of the characteristics of propagation in the fiber: a splice can cause a discontinuous change in chromatic dispersion. At the splice there is then a change from the chromatic dispersion of the first spliced fiber to the chromatic dispersion of the second spliced fiber.

By varying the characteristics of the preform, on the other hand, the chromatic dispersion along the drawn fiber can be described as continuous, i.e. there is no marked variation in chromatic dispersion over lengths of the order of a few centimeters. The characteristic distances referred to above are of the order of at least 1 km.

The fiber has a higher chromatic dispersion in the vicinity of its first end, which in use is its optical signal entry end. Because of the high chromatic dispersion of the fiber in the vicinity of its first end, non-linear 4-wave mixing (FWM) and crossed-phase modulation (XPM) effects are slight; from this point of view, the chromatic dispersion in the vicinity of the first end of the fiber is preferably close to the chromatic dispersion of a conventional line fiber, such as a single-mode fiber or a non-zero dispersion-shifted fiber. The fiber of the invention can thus be connected to the output of a repeater, instead of a conventional line fiber, without increasing non-linear effects excessively. Nor is it necessary, from this point of view, to adapt the repeater in order to connect the fiber according to the invention.

The average chromatic dispersion in the fiber is advantageously greater than +6 ps/(nm.km) over a length of at least 10 km. The chromatic dispersion threshold and length can be chosen as a function of the power of the input signal and non-linear effects; as explained in the paper by Atwood and Atcox cited above, the non-linear effects depend on the effective surface area, the intensity of the signal and the chromatic dispersion; their incidence decreases with the propagation length; it is therefore also possible to reduce the chromatic dispersion after a sufficient propagation distance, when the power levels of the signal are lower. The reduced chromatic dispersion does not lead to a significant increase in the penalties associated with non-linear effects. In this first portion of the fiber, the chromatic dispersion is not necessarily constant; it can rise or fall. It is always advantageous for the absolute value of the rate of longitudinal variation to be less than 0.6 ps/(nm.km$^2$). In effect, the chromatic dispersion of the first portion of the fiber is adjusted so that the penalties associated with non-linear effects remain below a particular threshold determined by the target performance of the transmission system and the cumulative chromatic dispersion remains at a minimum. To satisfy these two constraints, the local chromatic dispersion must vary slowly in the first portion of the fiber. It is nevertheless advantageous for the chromatic dispersion to decrease slowly (at a rate having an absolute value less than +0.6 ps/(nm.km$^2$)) in this first section of the fiber to minimize the cumulative chromatic dispersion of this portion, provided always that the linear effects remain below the threshold previously introduced.

The chromatic dispersion can then decrease. This adjustment of the chromatic dispersion to a value lower than that in the first portion of the fiber limits the cumulative chromatic dispersion in the remainder of the fiber and the section. Note that it is possible for the fiber to be connected to a fiber with a lower chromatic dispersion, as in the fist embodiment, or for the fiber to have a portion with a lower chromatic dispersion as far as its second end, as in the second embodiment. The FIG. 2 profile could therefore be completed by a portion of fiber with constant chromatic dispersion.

The chromatic dispersion at the exit end of the fiber depends on the transmission system. It must be sufficiently high to limit non-linear effects: a lower limit of 2.5 ps/(nm.km) is suitable. To reduce the cumulative chromatic dispersion over the length of the fiber, the chromatic dispersion at the second end of the fiber is less than the chromatic dispersion at the first end of the fiber. A difference between the chromatic dispersion at the first end and the chromatic dispersion at second end greater than or equal to 2.5 ps/(nm.km) achieves good reduction of cumulative chromatic dispersion. By considering the average chromatic dispersion in the first portion, it is also possible to impose a difference greater than or equal to 2.5 ps/(nm.km) between the average chromatic dispersion in the first portion and the chromatic dispersion at the second end of the fiber.

Figure 1:
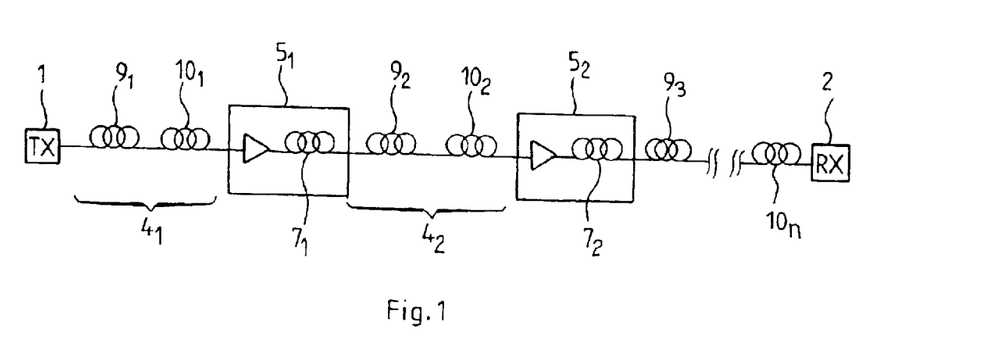
FIG. 1 shows an example of a transmission system using a fiber according to the invention.

FIG. 1 is a diagrammatic representation of a transmission system according to the invention. The figure shows a transmitter (TX) 1 and a receiver (RX) 2 connected by a plurality of line fiber sections $4_1$ to $4_n$. In this context "line fiber" means the fiber extending along the transmission system and whose length corresponds substantially to the length of the system. Repeaters $5_1$ to $5_{n-1}$ are disposed between the sections. A repeater typically comprises an erbium-doped fiber amplifier; there can also be a section of dispersion-compensating fiber $7_i$. This figure does not show filters and other components that have no direct influence on the operation of the invention.

At least one line fiber section $9_i$ consists of the fiber according to the invention, which is connected to the output of the repeater, followed by a fiber section $10_i$ having substantially constant chromatic dispersion. This preferably applies to all the sections.

The transmission system shown in this figure operates in the following manner. The transmitted signals are amplified in a repeater $5_{i-1}$; at the output of the repeater, the signals are first transmitted in the first portion of the fiber $9_i$, in which the chromatic dispersion is sufficiently high to limit non-linear effects; the signals are then transmitted in the second portion, in which the chromatic dispersion decreases rapidly. The signals then enter the second line fiber section $10_i$, in which they are transmitted to the next repeater.

The cumulative chromatic dispersion in a line fiber section is lower in the FIG. 1 system than in a prior art system. Consider by way of comparison a transmission system using non-zero dispersion-shifted line fiber with a chromatic dispersion of the order of 8 ps/(nm.km) at 1550 nm. With a 100 km section between repeaters, the cumulative chromatic dispersion on a 1550 nm channel is of the order of 800 ps/nm; for a chromatic dispersion slope close to 0.058 ps/(nm².km) at 1550 nm, the cumulative chromatic dispersion difference between two channels separated by 30 nm, one centered at 1550 nm and the other at 1580 nm, is of the order of 174 ps/nm.

Consider a system of the FIG. 1 kind. The fiber of the first section $9_i$ has a total length of 20 km; at its first end it has a chromatic dispersion of 9 ps/(nm.km) and at its second end it has a chromatic dispersion of 4 ps/(nm.km). The chromatic dispersion at 1550 nm decreases from 9 ps/(nm.km) to 6.5 ps/(nm.km) over a length of 20 km, at a rate of −0.125 ps/(nm.km²); the second fiber section is a non-zero dispersion-shifted fiber with a constant chromatic dispersion of 4 ps/(nm.km) at 1550 nm. The cumulative chromatic dispersion at 1550 nm in the section is of the order of 475 ps/(nm.km). The average chromatic dispersion slope at 1550 nm in the fiber $9_i$ of the first section is of the order of 0.042 ps/(nm².km) and that in the fiber $10_i$ of the second section is of the order of 0.024 ps/(nm².km). Over the section as a whole, the cumulative chromatic dispersion difference between two channels separated by 30 nm, one centered at 1550 nm and the other at 1580 nm, is of the order of 83 ps/(nm.km).

The invention limits the length of dispersion-compensating fiber needed to compensate the cumulative chromatic dispersion in the line fiber, and to reduce the line losses accordingly, compared to the transmission system selected for comparison. For example, with dispersion-compensating fiber characterized by an attenuation of 0.5 dB/km and a chromatic dispersion at 1550 nm of −100 ps/(nm.km), the invention reduces by a factor of approximately 1.7 the length of dispersion compensating fiber used in the system and thereby reduces line losses by approximately 1.63 dB. This reduction can be obtained by reducing the length of fiber in each of the repeaters including the dispersion-compensating fiber, but the number of dispersion-compensating fiber sections in the transmission system can also be reduced.

Note that a fiber section with constant chromatic dispersion could be provided between the output of a repeater and the FIG. 1 fiber; this would have no effect on the operation of the fiber according to the invention, and would increase the cumulative chromatic dispersion and the number of splices between fibers. It is also clear that dispersion compensators other than dispersion-compensating fiber could be used, for example Bragg gratings or other devices; it is also possible to use the dispersion-compensating fiber as line fiber. In all cases, the invention limits the cumulative chromatic dispersion to be compensated.

In the FIG. 1 example, the fiber $10_i$ of the second section could equally well be integrated into the fiber $9_i$ according to the invention. This would further reduce the losses caused by splicing two fiber sections.

Preferred propagation characteristics of the fiber according to the invention are given next, before describing one embodiment of the fiber. The following propagation characteristics are measured at 1550 nm unless otherwise indicated:

cut-off wavelength measured over 2 meters (m) less than 1550 nm;

in-cable cut-off wavelength less than 1300 nm;

effective surface area greater than 40 $\mu m^2$ and preferably greater than 45 $\mu m^2$;

sensitivity to microbending less than 1, preferably less than or equal to 0.5;

mode diameter greater than 4 $\mu m$;

bending losses less than $10^{-3}$ dB for 100 turns with a radius of 30 millimeters (mm); and bending losses less than 20 decibels per meter (dB/m) for a loop with a radius of 10 mm.

With an effective cut-off wavelength according to the ITU-T G650 standard less than 1550 nm, monomode operation of the fiber is achieved in the C and L bands. The sensitivity of the fiber to microbends is evaluated comparatively, relative to the applicant's ASMF 200 fiber; the method known in the art of crushing the fiber between two grids can be used.

The bending losses are evaluated in a manner that is known in the art by measuring the losses generated by coiling the fiber. For example, 100 turns of the fiber can be coiled around a 30 mm radius former and the resulting losses measured; it is also possible simply to form a loop of fiber around at 10 mm radius former and measure the linear losses. The limits on the bending losses ensure that the fiber according to the invention can withstand incorporation into a cable.

Figure 2:
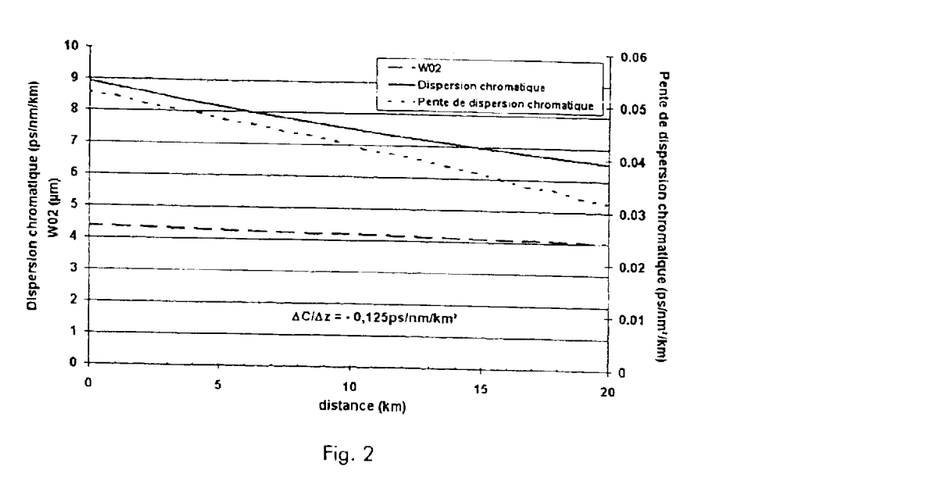
FIG. 2 is a diagrammatic representation of chromatic dispersion, chromatic dispersion slope and mode radius as a function of length in one embodiment of a fiber according to the invention.

FIG. 2 is a diagrammatic representation of chromatic dispersion, chromatic dispersion slope and mode radius as a function of length for a first embodiment of a fiber in accordance with the invention. In the graph, the chromatic dispersion in ps/(nm.km), the W02 mode diameter in $\mu m$ and the chromatic dispersion slope in ps/(nm².km) are plotted on the ordinate axis. The length of the fiber in km is plotted on the abscissa axis. The length of the fiber is measured from the first end of the fiber, which is therefore represented in the left-hand portion of the figure.

As shown in the figure, the chromatic dispersion varies continuously and regularly from 9 ps/(nm.km) at the first end to 6.5 ps/(nm.km) at the second end. This decrease corresponds to a rate of variation of the chromatic dispersion of −0.125 ps/(nm.km²). The chromatic dispersion slope varies from 0.053 ps/(nm².km) to 0.031 ps/(nm².km). The mode diameter remains substantially constant throughout the length of the fiber, with a value close to 4 μm. At λ=1.55 μm, the average chromatic dispersion and the average chromatic dispersion slope are respectively 7.8 ps/(nm.km) and 0.042 ps/(nm².km). More generally, the fiber could have a length of 10 to 35 km and a rate of longitudinal variation of chromatic dispersion in the range −1.4 ps/(nm.km²) to −0.05 ps/(nm.km²). These values ensure that the chromatic dispersion variation from one end of the fiber to the other is in the range 2.5 ps/(nm.km) to 14 ps/(nm.km).

Figure 3:
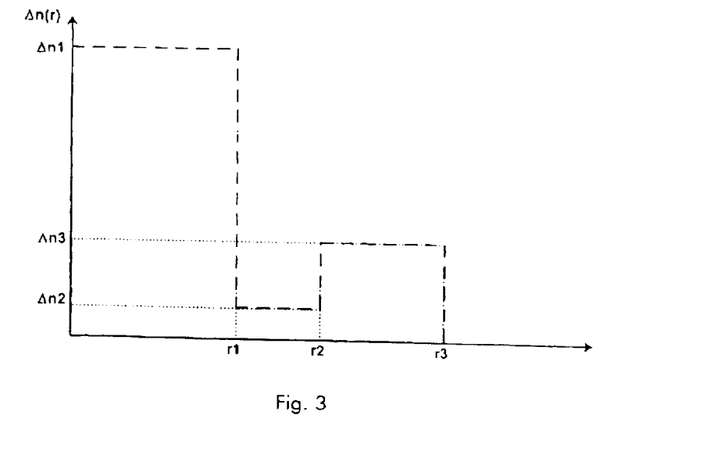
FIG. 3 shows one example of the general shape of the profile of a fiber according to the invention.

FIG. 3 is a diagrammatic representation of the set point index profile of a fiber according to the invention; in this example the shape of the index profile is a rectangle with a buried trench and a ring (see above); the chromatic dispersion is varied along the fiber by simply varying the indices, with constant radii. Starting from the center of the fiber, the profile features:

a central part with a substantially constant index greater than or equal to the index of the cladding, and an annular part with an index less than or equal to the index of the cladding.

The combination constitutes an index profile whose shape is referred to as "a rectangle with a buried or depleted trench".

The FIG. 3 fiber has a ring around the buried trench, i.e. a portion with an index greater than the index of the cladding, which explains the term "rectangle with a buried trench and a ring". The table below sets out index and radius values for the FIG. 2 fiber. In the table, $r_1$ is the radius of the central portion of the fiber, $r_2$ is the outside radius of the buried trench and $r_3$ is the outside radius of the ring.

$\Delta n_1$, $\Delta n_2$ and $\Delta n_3$ are respectively the index differences between the cladding and the rectangle, the buried part and the ring.

The table gives values for the above parameters at both ends of the FIG. 2 fiber. It shows that the variation in the optical characteristics of the fiber can be obtained by simply varying the index of the buried trench. This index variation can be obtained when fabricating a preform by continuously varying the dopant concentration of the layers deposited during the MCVD or VAD phase. The variation of the profile in the fiber is referred to above as "continuous"; in practice this "continuity" is a function of the nature of the systems for controlling the dopant concentration used to fabricate the preform. It is found that in practice the optical characteristics of the drawn fiber actually vary continuously along the fiber.

| $r_1$ (μm) | $r_2$ (μm) | $r_3$ (μm) | $\Delta n_1 \times 1000$ | $\Delta n_2 \times 1000$ | $\Delta n_3 \times 1000$ |
|---|---|---|---|---|---|
| 3.23 | 6.81 | 9.95 | 7.5 | 0 | 2.3 |
| 3.23 | 6.81 | 9.95 | 7.5 | −1.9 | 2.3 |

Figure 4:
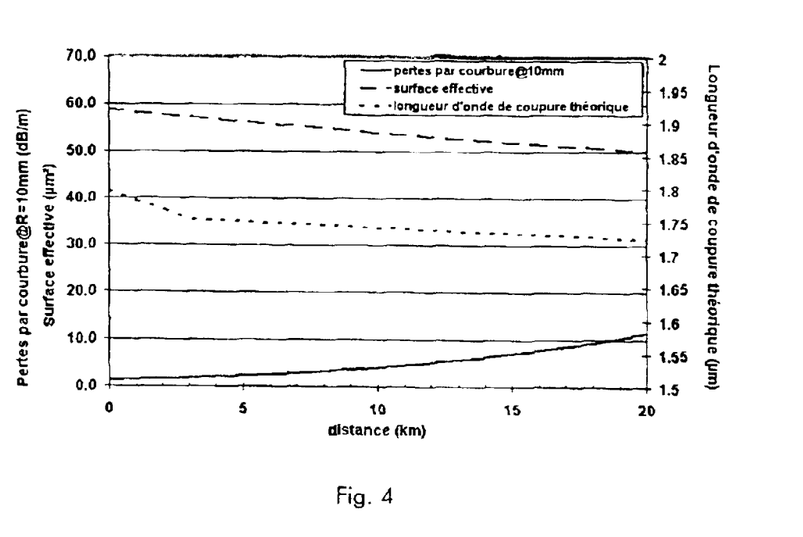
FIG. 4 represents propagation characteristics of the FIG. 2 fiber.

FIG. 4 shows other propagation characteristics of the FIG. 2 fiber. The length of the fiber is plotted on the abscissa axis, as in FIG. 2. The bending losses, effective surface area and theoretical cut-off wavelength are plotted on the ordinate axis. The graph shows that these parameters vary little along the fiber.

Figure 5:
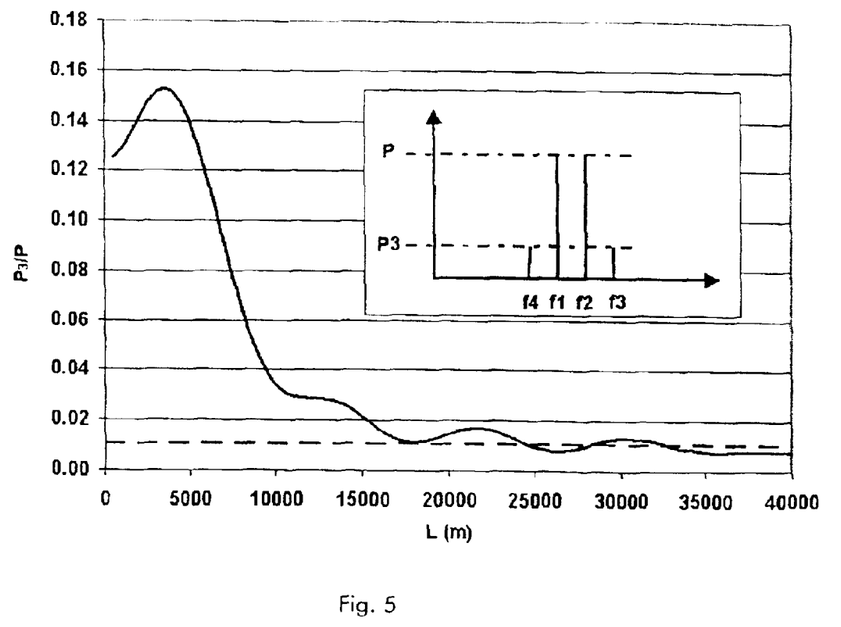
FIG. 5 is a graph showing the efficiency of 4-wave mixing in a system of the FIG. 1 kind using a fiber of the FIG. 2 kind.

FIG. 5 is a representation of the efficiency of 4-wave mixing as a function of the length L for two channels separated by a frequency difference equal to 50 GHz and with a power of 20 dBm per channel. The panel symbolizes the process of interaction of 4-wave mixing with the generation of frequencies f3=2f1−f2 and f4=2f2−f1 at a power P3 by interaction of two channels at frequencies f1 and f2 at a power P. The calculation is effected for a total section length of 100 km comprising L km of the fiber of the example and (100−L) km of fiber having a chromatic dispersion of +4 ps/(nm.km) and an effective surface area of 43 μm². The horizontal line indicates the efficiency of 4-wave mixing in 100 km of fiber characterized by a chromatic dispersion of +7.5 ps/(nm.km) and an effective surface area of 60 μm².

FIG. 5 shows that a 100 km section comprising 20 km of fiber of the example and 80 km of fiber characterized by a constant chromatic dispersion of +4 ps/nm/km and an effective surface area of 43 μm² has a level of 4-wave mixing comparable to that of a 100 km fiber having a constant chromatic dispersion of +7.5 ps/(nm.km) and an effective surface area of 60 μm².

In the first section (20 km of fiber of the example +80 km of fiber with a chromatic dispersion of +4 ps/(nm.km) and an effective surface of 43 μm²), the cumulative chromatic dispersion is 475 ps/nm. Since the average chromatic dispersion slope of the second fiber is 0.024 ps/(nm².km) and that of the fiber of the invention is 0.042 ps/(nm².km), an average chromatic dispersion slope of 0.0276 ps/(nm².km) is obtained over the 100 km section. The cumulative chromatic dispersion difference between two channels separated by 30 nm, one centered at 1550 nm and the other at 1580 nm, is consequently of the order of 83 ps/nm.

In comparison, in a 100 km section of fiber having a chromatic dispersion of +7.5 ps/(nm.km) and characterized by a chromatic dispersion slope of 0.058 ps/(nm².km), the cumulative chromatic dispersion at the end of the section is 750 ps/nm and the cumulative chromatic dispersion difference between two channels separated by 30 nm, one centered at 1550 nm and the other at 1580 nm, is 174 ps/nm. Using the FIG. 2 fiber therefore significantly reduces the cumulative chromatic dispersion in the line fiber.

If the cumulative chromatic dispersion is compensated by dispersion-compensating fiber characterized by a chromatic dispersion of −100 ps/(nm.km) at 1550 nm and an attenuation of 0.5 decibels per kilometer (dB/km), the invention reduces by a factor of approximately 1.6 the length of compensating fiber needed in the system and reduces the line losses by approximately 1.4 dB. Another advantage of using the fiber according to the invention is that using fiber with low chromatic dispersion in the second portion of the section greatly reduces the average chromatic dispersion slope.

As indicated above, it is possible to include in the fiber of the invention the fiber with low chromatic dispersion that is used in the transmission system. This solution avoids the need for a splice to form the line fiber.

A second embodiment of the invention is described next with reference to FIGS. 6, 7 and 8. In this second embodiment, the chromatic dispersion does not vary in a regular manner along the fiber, but is instead concentrated into a length of the fiber less than the total length of the fiber (see above).

Figure 6:
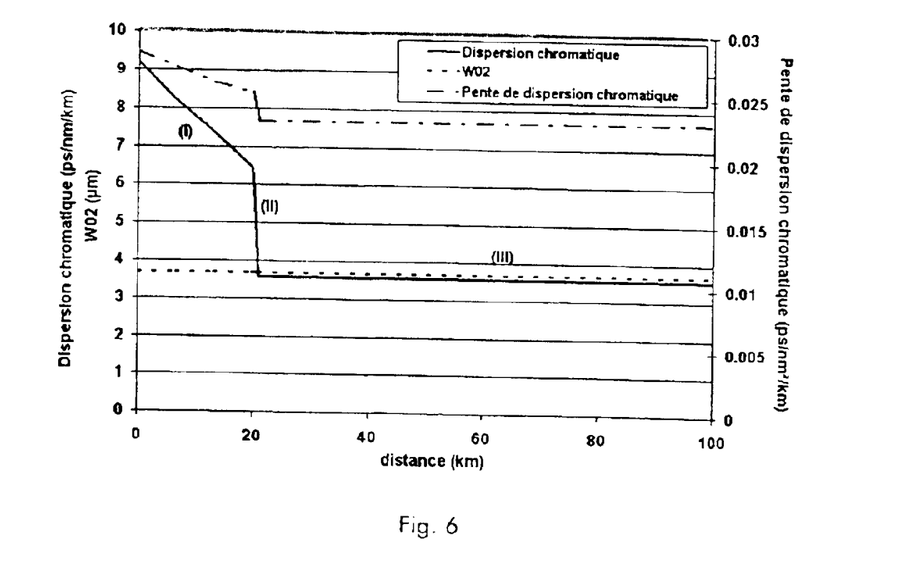
FIGS. 6, 7 and 8 are representations similar to those of FIGS. 2, 4 and 5, relating to a second embodiment of a fiber according to the invention.

FIG. 6 is analogous to FIG. 2. It shows a fiber which has a first portion in the vicinity of the first end in which the chromatic dispersion varies slowly. The fiber has a second portion in the vicinity of its second end in which the chromatic dispersion is substantially constant. The chromatic dispersion decreases between these two portions with a greater rate of longitudinal variation than in the first portion. To be more specific, it is again advantageous for the first portion to have a length greater than or equal to 10 km and a rate of longitudinal variation of chromatic dispersion in the range −0.6 ps/(nm.km$^2$) to +0.1 ps/(nm.km$^2$). It is not essential to the invention for the chromatic dispersion to decrease as in the example shown in the figure.

The fiber has a second portion in the vicinity of the second end which has a chromatic dispersion less than 4 ps/(nm.km). The cumulative chromatic dispersion in the fiber is less than that of a prior art fiber; as the power of the signals is more limited in this section of the fiber, non-linear effects do not represent a penalty. It is also advantageous for the chromatic dispersion in this second portion always to be less than 3 ps/(nm.km); it is not essential for the chromatic dispersion to be constant, however, as in the example.

The chromatic dispersion decreases between the above two portions, typically with a rate of variation in the range −14 ps/(nm.km$^2$) to −0.5 ps/(nm.km$^2$). These limits are determined by imposing a decrease in the chromatic dispersion of at least +2.5 ps/(nm.km) and at most +14 ps/(nm.km) over a distance of 1 to 5 km between the two fiber portions considered above. With these values, the reduction of the chromatic dispersion between the two portions of the fiber achieves a reduction of cumulative chromatic dispersion from at least 225 ps/nm to at most 1050 ps/nm when the length of the second portion is 75 km. At λ=1.55 μm, the average chromatic dispersion and the average chromatic dispersion slope are respectively 4.15 ps/(nm.km) and 0.024 ps/(nm$^2$.km). This example advantageously corresponds to fabrication of the preform by the method described in EP-A-0 737 873 or by the VAD process. In the case of a fiber fabricated by the MCVD process in particular, the chromatic dispersion can also vary over a length of 10 to 35 km, with a rate of longitudinal variation in the range −1.4 ps/(nm.km$^2$) to −0.07 ps/(nm.km$^2$).

These characteristics can be obtained with the FIG. 3 profile and the parameter values set out in the table below. Line (I) gives values at the first end of the fiber, line (II) gives values at the end of the first portion and line (III) gives values in the second portion. The radii r1, r2 and r3 vary between the start and the end of a section with a relationship of geometrical similarity. The radii decrease by a factor of approximately 1.035 between the start and the end of the section (I) (transition from index profile I to index profile II) and the start and end of the second section (II) (transition from index profile II to index profile III). The third section (III) keeps the index profile III. These variations of the radii can be obtained by varying the surface coating diameter in a linear manner in the preform sections corresponding to the areas (I) and (II), for example. In this example, for a surface coating diameter of 60 mm, section (I) has a length of 19 km in the fiber, corresponding to a length of approximately 9 cm in the preform, and section (II) has a length of 1 km in the fiber, corresponding to a length of approximately 0.4 cm in the preform.

separated by a frequency difference equal to 50 GHz and with a power of 20 dBm per channel. The calculation is effected for a total section length of 100 km by varying the length L of the section (I)+(II). The horizontal line indicates the efficiency of 4-wave mixing in 100 km of fiber characterized by a chromatic dispersion of +7.5 ps/(nm.km) and an effective surface area of 43 μm$^2$. FIG. 8 shows that if the length of the section (I)+(II) is of the order of 15 km, the fiber of the example has a level of 4-wave mixing corresponding to that of a 100 km fiber characterized by a chromatic dispersion of +7.5 ps/(nm.km) and an effective surface area of 43 μm$^2$.

In this example, the cumulative chromatic dispersion is 440 ps/nm. The cumulative chromatic dispersion difference between two channels separated by 30 nm, one centered at 1550 nm and the other centered at 1580 nm, is of the order of 72 ps/nm. These values should be compared with a conventional line fiber (see above).

In the first two embodiments described by way of example, the fibers are in one piece and are obtained from the same preform. Longitudinal and continuous variation of the transmission characteristics can then be obtained by varying in a linear manner the thicknesses of the layers deposited on the preform by the CVD or VAD process, as in the first embodiment, in which the index decrease $\Delta n_2$ is linear from 0 to −1.9×10$^{-3}$. The longitudinal variations in the transmission characteristics then depend on those of the index profile.

Compared to splicing fibers to approximate the FIG. 2 profile, this solution avoids the technical problem of producing many fibers with different chromatic dispersions. This solution also avoids splicing losses for all the spliced fibers. It is necessary to allow for a loss of approximately 0.1 dB per splice in fibers having the same mode diameter. In the second embodiment, using a spliced fiber for the first portion of the fiber has, in addition to the drawbacks just mentioned, the drawback that it is not possible to decrease the chromatic dispersion over about the first 20 kilometers. In this second embodiment, the decrease in the chromatic dispersion in the first portion reduces the cumulative chromatic dispersion by almost 50 ps/nm. The benefit of this reduction of 50 ps/nm would not be obtained by replacing the fiber of this example with a fiber of constant chromatic dispersion, which would necessarily have a chromatic dispersion greater than or equal to +9 ps/(nm.km) to guarantee the same cumulative non-linearities at the beginning of the section, in which the power of the signals is at a maximum.

It is nevertheless possible to use other techniques to obtain fibers in accordance with the invention, such as those described in EP 0 737 873 A2. For example, the core section of the preform can be ground, followed by plasma deposition of silica to obtain a final preform of constant diameter.

| Profile | r1 (μm) | r2 (μm) | r3 (μm) | Δn1 × 1000 | Δn2 × 1000 | Δn3 × 1000 |
|---|---|---|---|---|---|---|
| I | 3.32 | 6.22 | 8.9 | 8.6 | −3.65 | 3 |
| II | 3.21 | 6.01 | 8.6 | 8.6 | −3.65 | 3 |
| III | 3.1 | 5.8 | 8.3 | 8.6 | −3.65 | 3 |

Figure 7:
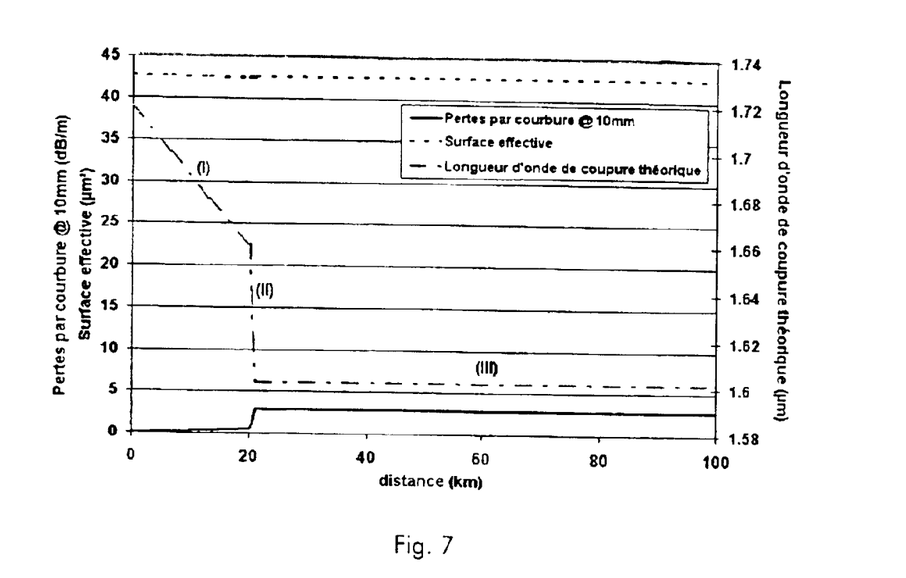

FIG. 7 is analogous to FIG. 4. It shows the longitudinal and local variations of the bending losses, the effective surface area and the theoretical cut-off wavelength.

Figure 8:
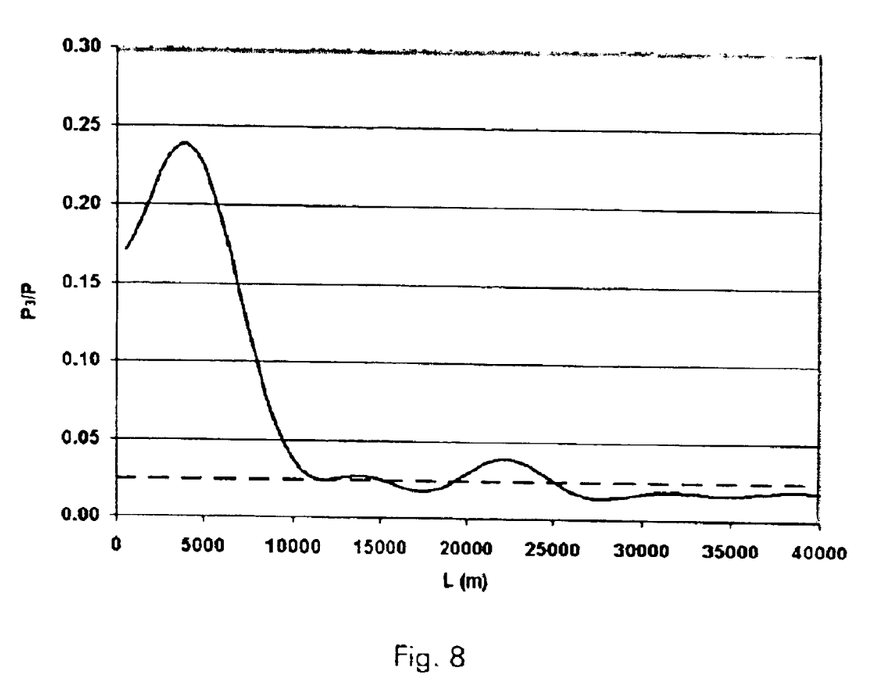

FIG. 8 is analogous to FIG. 5. It shows the efficiency of 4-wave mixing as a function of length L for two channels This kind of technique can produce slow or sudden variations in the local longitudinal characteristics of the fibers after drawing the preform.

The person skilled in the art knows how to fabricate a fiber according to the invention using processes known in the art such as the MCVD or OVD process or other processes routinely used to fabricate optical fibers. Unlike the prior art processes, the fiber can be fabricated without varying the radii along the fiber. This considerably simplifies preparing the preform. It is sufficient to change the dopant concentration during deposition to vary the indices. It is not necessary to obtain a variation in the thickness of each layer deposited, however.

Of course, the present invention is not limited to the examples and embodiments described and shown, which lend themselves to many variants that will be evident to the person skilled in the art. The fiber of the invention can be used in systems other than those shown in FIG. 1; it is also possible to obtain a fiber according to the invention with a profile different from that of FIG. 3. In the first embodiment, as in the second, it is possible to choose values of chromatic dispersion other than those specified by way of example.

What is claimed is:

1. An optical fiber having, at an operating wavelength, at its first end a chromatic dispersion in the range +6 ps/(nm.km) to +17 ps/(nm.km) and at its second end a chromatic dispersion in the range +3 ps/(nm.km) to +14 ps/(nm.km) and in which the difference between the chromatic dispersion at the first end of the fiber and the chromatic dispersion at the second end of the fiber is greater than or equal to 2.5 ps/(nm.km) and the chromatic dispersion varies continuously along the fiber.

2. A fiber according to claim 1, having a first portion in the vicinity of its first end in which the average chromatic dispersion is greater than or equal to 6 ps/(nm.km).

3. A fiber according to claim 2, wherein the first portion has a length greater than or equal to 10 km.

4. A fiber according to claim 2, wherein the rate of longitudinal variation of the chromatic dispersion in the first portion is in the range $-1.4$ ps/(nm.km$^2$) to $+0.1$ ps/(nm.km$^2$).

5. A fiber according to claim 1, wherein the rate of variation of chromatic dispersion along the fiber is substantially constant.

6. A fiber according to claim 5, wherein said rate has a value in the range $-1.4$ ps/(nm.km$^2$) to $-0.05$ ps/(nm.km$^2$).

7. A fiber according to claim 1, wherein the variation of chromatic dispersion is effected substantially completely within a length of the fiber less than the total length of the fiber.

8. A fiber according to claim 7, wherein the length of the portion of the fiber in which the chromatic dispersion decreases is in the range 10 km to 35 km.

9. A fiber according to claim 8, wherein the rate of longitudinal variation of the chromatic dispersion in the portion of the fiber in which the chromatic dispersion decreases is in the range $-1.4$ ps/(nm.km$^2$) to $-0.07$ ps/(nm.km$^2$).

10. A fiber according to claim 7, wherein the length of the portion of the fiber in which the chromatic dispersion decreases is in the range 1 km to 5 km.

11. A fiber according to claim 10, wherein the rate of longitudinal variation of the chromatic dispersion in the portion of the fiber in which the chromatic dispersion decreases is in the range $-14$ ps/(nm.km$^2$) to $-0.5$ ps/(nm.km$^2$).

12. A fiber according to claim 1, having a second portion in the vicinity of its second end in which the chromatic dispersion is less than or equal to 14 ps/(nm.km).

13. A fiber according to claim 12, wherein the second portion has a length greater than or equal to 1 km.

14. A fiber according to claim 1, having at any point an index profile in the shape of a rectangle with a depleted trench and a ring.

15. A fiber according to claim 14, wherein the radii of the rectangle, the depleted trench and the ring are identical along the fiber.

16. A transmission system including at least one repeater and a fiber according to claim 1 receiving at its first end signals amplified in the repeater.

17. A system according to claim 16, wherein a fiber with substantially constant chromatic dispersion is connected to the second end of said fiber.

18. The optical fiber according to claim 1, wherein the operating wavelength is 1550 nm.

19. A non-uniform continuous optical fiber having, at an operating wavelength, at its first end a chromatic dispersion in the range +6 ps/(nm.km) to +17 ps/(nm.km) and at its second end a chromatic dispersion in the range +3 ps/(nm.km) to +14 ps/(nm.km) and in which the difference between the chromatic dispersion at the first end of the fiber and the chromatic dispersion at the second end of the fiber is greater than or equal to 2.5 ps/(nm.km).

20. The optical fiber according to claim 19, wherein the operating wavelength is 1550 nm.

* * * * *